(12) United States Patent
Gervais et al.

(10) Patent No.: US 8,907,894 B2
(45) Date of Patent: Dec. 9, 2014

(54) TOUCHLESS POINTING DEVICE (75) Inventors: William J. Gervais, Northridge, CA (US); Mark H. Helmick, Ventura, CA (US)

(73) Assignee: Northridge Associates LLC, Simi Valley, CA (US)

(*) Notice: Subject to any disclaimer, the term of this patent is extended or adjusted under 35 U.S.C. 154(b) by 187 days.

(21) Appl. No.: 12/732,086

(22) Filed: Mar. 25, 2010

(65) Prior Publication Data

US 2011/0090147 A1   Apr. 21, 2011

Related U.S. Application Data

(60) Provisional application No. 61/253,434, filed on Oct. 20, 2009.

(51) Int. Cl.
*G06F 3/033* (2013.01)
*G06F 3/01* (2006.01)
*G06F 3/03* (2006.01)
*G06F 3/042* (2006.01)

(52) U.S. Cl.
CPC .............. *G06F 3/017* (2013.01); *G06F 3/0304* (2013.01); *G06F 3/0428* (2013.01)
USPC ........................................................ 345/157

(58) Field of Classification Search
USPC ........................................................ 345/158
See application file for complete search history.

(56) References Cited

U.S. PATENT DOCUMENTS

| 5,168,531 A | 12/1992 | Sigel |
| 5,577,848 A | 11/1996 | Bowen |
| 5,821,922 A | 10/1998 | Sellers |
| 5,900,863 A | 5/1999 | Numazaki |
| 5,959,612 A | 9/1999 | Breyer et al. |
| 6,130,663 A * | 10/2000 | Null ............................. 345/158 |
| 6,281,878 B1 | 8/2001 | Montellese |
| 6,313,825 B1 | 11/2001 | Gilbert |
| 6,333,735 B1 | 12/2001 | Ankevar |
| 6,421,042 B1 | 7/2002 | Omura et al. |
| 6,657,853 B2 * | 12/2003 | Oba et al. ................... 312/223.2 |

(Continued)

FOREIGN PATENT DOCUMENTS

WO   2007/137093 A2   11/2007

OTHER PUBLICATIONS

European Search Report for corresponding European patent application No. 12050971.8, dated Jun. 6, 2012.

*Primary Examiner* — Van Chow
(74) *Attorney, Agent, or Firm* — Paul Y. Feng; One LLP (57) ABSTRACT

A touchless input device for a computer replaces a computer mouse and does not require physical contact between the user-operator and any part of the input device. The touchless input device uses multiple, linear near infrared, optical sensors and multiple near infrared light emitters working in a plane in space, all held inside a frame with an opening that defines the detection region. The device images the plane and processes the images to determine the presence, location and velocity of objects in the plane. The operator introduces an object, such as a finger, into the plane and moves the object in the plane to emulate the motion of a computer mouse across a desktop. Mouse buttons and other functions are emulated by unique motions in the plane. The device communicates these motions and events to the computer typically using a Universal Serial Bus.

20 Claims, 10 Drawing Sheets

(56) References Cited

U.S. PATENT DOCUMENTS

| | | |
|---|---|---|
| 6,738,041 B2 | 5/2004 | Silber |
| 6,747,632 B2 | 6/2004 | Howard |
| 6,791,531 B1 | 9/2004 | Johnston et al. |
| 6,857,746 B2 | 2/2005 | Dyner |
| 7,002,550 B2 | 2/2006 | Casebolt et al. |
| 7,058,204 B2 | 6/2006 | Hildreth et al. |
| 7,305,368 B2 | 12/2007 | Lieberman et al. |
| 7,414,705 B2 | 8/2008 | Boillot |
| 2002/0068985 A1 | 6/2002 | Oba et al. |
| 2005/0024324 A1 | 2/2005 | Tomasi et al. |
| 2007/0085828 A1 | 4/2007 | Schroeder et al. |
| 2007/0120834 A1* | 5/2007 | Boillot .................. 345/173 |
| 2008/0100572 A1* | 5/2008 | Boillot .................. 345/158 |
| 2009/0116742 A1 | 5/2009 | Nishihara |
| 2009/0139778 A1 | 6/2009 | Butler et al. |

* cited by examiner

TOUCHLESS POINTING DEVICE

CROSS-REFERENCE TO RELATED APPLICATIONS

This application claims priority from U.S. Provisional Application No. 61/253,434, filed Oct. 20, 2009, whose contents are incorporated by reference in their entirety.

FIELD OF THE INVENTION

The present invention is directed to a data input device or controller for an electronic device such as a computer. More precisely, the present invention is directed to a touchless pointing device that may input data and/or control the cursor of a computer or like electronic device.

BACKGROUND

It is well known to input text or data or to control a cursor of a computer, laptop, personal digital assistant, video game, vending machine, Automated Teller Machine at a bank, security panel, etc., via a keyboard, touch pad, key pad, mouse, track ball, joystick, touch sensitive screen, and the like. There have been improvements such that the user does not need to physically touch the input device to control the computer. For example, U.S. Pat. No. 6,313,825 (Gilbert) teaches an input device for a computer that detects movement of an object such as a finger within a field of space to input commands into the computer. The input device uses infrared radiation or ultrasonic waves to illuminate and sense the detection field for the user's finger or hand movements. U.S. Pat. No. 5,821,922 (Sellers) uses a video camera mounted on a laptop to detect hand movements in a region above the keyboard, wherein the hand movements are translated into cursor movements. U.S. Pat. No. 6,421,042 (Omura et al.) uses light projected over a writing surface which when interrupted by a finger is detected by CCD cameras. Data from the cameras are then converted via deciphering software into command codes for operating a computer, AV equipment, a DVD player, etc.

U.S. Pat. No. 6,130,663 (Null) discloses a touchless input apparatus, wherein the apparatus uses rotating drums with helical slits that cyclically emit infrared radiation to a field above the apparatus. Finger movement in that field is detected, and timing and triangulation software are used to convert finger movement to control signals for the computer. U.S. Pat. No. 6,791,531 (Johnston et al.) discloses a computer input controller, wherein infrared radiation is directed to a field above a keyboard, and a user's finger gestures is detected through an imaging lens by a CCD sensor. The sensor and associated electronics convert the data to computer control commands. U.S. Pat. No. 6,281,878 (Montellese) discloses a similar input device using a light sensor positioned to sense reflections from an illuminated field, which field acts as a virtual template for a keyboard, keypad, button panel.

SUMMARY OF THE INVENTION

The present invention is directed to a touchless input device for controlling a computer, laptop, electronic apparatus, or the like without actual physical contact with the input device. In a preferred embodiment, the present invention is directed to a touchless pointing device to control a computer in a sterile environment wherein the user does not directly contact the pointing device for operation. The touchless pointing device in the preferred embodiment has a frame with a top edge, a bottom edge, a first planar area between the top and bottom edges containing a polygonal opening therethrough, and a compartment adjacent the bottom edge, the compartment having a front wall defining a second planar area, wherein the second planar area is substantially parallel to the first planar area. The device frame includes an optional support or foot adjacent the top edge to incline the frame toward the user for improved ergonomics. The device frame may also be mounted vertically as on a vending machine, a point-of-sale kiosk, or security keypad on a doorway or gate, etc.

The device preferably uses at least a first and a second near infrared emitter/detector assemblies or combinations disposed at opposite locations in the compartment and aimed at the polygonal opening in the flat area of the frame, projecting and detecting the near infrared signal within a first detection region defined by the polygonal opening containing the x and y axes and the first and second planar areas which space therebetween defining the z axis. In the preferred embodiment, the polygonal opening is a rectangular shape that is proportional to the aspect ratio of, for example, 4:3 or 16:9 for a computer display. The confines of the open rectangle gives the user a representation of the computer screen to correlate his finger movements within the opening proportionally with the cursor movement on the actual display screen. With the through-hole opening in the frame, no infrared background reflector, writing surface, work pad, or work surface is needed. And no buttons, touch, or contact surfaces are needed for operating the touchless input device.

Optional third and a fourth near infrared emitter/detector assemblies contained within the compartment are aimed through apertures at the bottom of the frame to define second and third detection regions proximate the apertures. These third and a fourth infrared emitter/detector assemblies or combinations emulate left and right mouse clicks when an intrusion of a finger enters their respective detection regions.

Also, a lens and a near infrared band pass filter are adapted to at least the first and second emitter/detector assemblies to filter out unwanted ambient and background light. The first and second emitter/detector assemblies are aimed toward the common first detection region in a crisscross fashion, with their signals passing through an optional focusing lens. The focusing lens is preferably a half cylinder lens located in front of the two infrared emitters. Near infrared linear detectors are used to detect reflections from the user's finger by measuring the centroid of the finger as it intrudes into and moves within the planar detection zone.

A digital signal processor is connected to the infrared emitter/detector assemblies for processing the imaging signals received from the detectors. A power and signal cable, such as a Universal Serial Bus (USB) cable, connects the computer to the digital signal processor. Using triangulation methods to compile the signals from the detectors, the microprocessor interprets hand gestures and converts the signal to ordinary mouse control protocol which is fed to the computer. The digital signal processor causes the cursor on the computer display to be manipulated and moves as desired by the user's finger gestures within the detection regions.

DETAILED DESCRIPTION OF THE PREFERRED EMBODIMENTS

The present invention is generally directed to a touchless Human Input Device ("HID"), and more precisely directed to a touchless pointing device, to replace or supplement a computer mouse, a like pointing device, or remote controller for inputting data into and/or controlling a computer, such as the cursor of the computer display. The touchless aspect is that the user never needs to come in physical contact with the input device to operate the device. A target application is in the dental field, medical field, or hospital environment where a doctor, medical worker, or health care provider needs to control a computer, yet does not want to physically touch or come in contact with a mouse because of hygienic reasons, disease transmission, or lack of sterile contact surfaces.

Additional applications include controlling information kiosks, input for gaming systems, input for military fire-control systems, motion capture, positional data acquisition, controlling presentation software, computer input for dirty or dusty environments, computer input for operators with dirty hands or who gloves and cannot easily activate keypads or a mouse, computer input for wet environments, computer control for people with limited mobility or finger dexterity, computer input for environments with high shock or vibration, and computer input for extremely cold environments. The present invention touchless HID can be used to replace touch screens where touch screens would be vulnerable to weather, impact, harsh environments, theft, or vandalism, such as on a vending machine, security gate, ATM machine, vehicle navigation system, etc. For those who are severely physically disabled, the touchless HID may be used with one finger to function as a controller for a motorized wheelchair, a television remote, and the like. The touchless HID device can further be an economical alternative to touch screens in large screen applications. There may be many other applications for this invention.

In a preferred embodiment of the present invention, the human operator interacts with the computer by moving his or her finger or another object though a planar region of space to simulate the motion of a mouse across the table top. This planar region could be oriented horizontally, such as a few inches above a desk, or could be oriented vertically, such as in a plane parallel to a computer monitor, or any other planar orientation.

A computer mouse has two basic functions: it reports changes in the position of the mouse moving across a plane, and it reports presses of its button(s). The present invention touchless HID accomplishes this by imaging this planar region and calculating the presence, location, and motion of the user's finger, stylus, pen, or other object. It then translates this information into mouse motions and mouse button clicks. The mouse button emulation can be accomplished either by detecting unique sequences of motion in the optical plane, or by using separate sensing devices. This problem breaks down to two parts: detecting the presence, position, and motion of objects in the plane, and translating this information into mouse moves and button presses.

Detecting the Presence, Position, and Motion of Objects in the Plane

One approach is to use two or more linear imager sensors, which consists of a single row of light sensing elements. These sensors are commonly found in photocopiers, fax machines and bar code readers to scan a page or a bar code. Early prototypes of the present invention used a Melexis MLX90255 device, which has 128 sensing elements in it. Similar devices are made by Toshiba, Hamamatsu, Fairchild and others. The present invention touchless HID preferably uses two of these devices, each looking into the detection region where the user puts his or her finger or other object (the "active region") from a different angle, (typically 90 degrees) and on a common plane. That is, there is an imaginary plane in space, which is viewed by the sensors from two edges of the plane. Any finger or object (preferably cylindrical) intersecting the plane in the area will fall into the view of the sensors.

A lens assembly with an aperture focuses the image of the finger or object onto the imagers. The lens and aperture assembly is designed to provide a high "F-stop" number to obtain good depth-of-field and a 90-degree field of view. Correlating the two views (similar to stereo vision) of the object in the planar detection region can identify in two dimensions the position of the finger(s) or object(s) using digital signal processing techniques. The same method could be utilized with two dimensional imagers (like CMOS and CCD cameras) by selecting slices of the image to work with. One embodiment of the Melexis device is based on previous experience with the device, and the ease with which it interfaces to microprocessors and digital signal processors. Most of the other devices have more sensing elements, which would provide higher resolution, but would require much more processing power to exploit.

The active region is illuminated using, preferably, monochromatic, invisible, near infrared LED light sources of about 0.74 µm to 1.4 µm in wavelength. The imagers have optical filters to favor the wavelength of light from the near infrared LEDs and exclude much of the light of ambient and other light sources, such as sunlight, desktop incandescent lighting, overhead fluorescent lighting and the like. Other wavelengths aside from near infrared could be used as long as the light source and the imager filter are matched. Infrared is chosen because it is easier to filter from background light, it is not visible to the human eye, and many lighting fixture in common use do not radiate very much in the near infrared frequency range. Background optical noise is reduced by synchronously modulating the light sources and sampling the imagers, i.e., the light source is turned on and an image is captured, then the light source is turned off and another image is captured. Then the second image is subtracted from the first image, revealing only the parts of the image that were illuminated by the light source. Multiple light sources located at different angles to the active region can be used to further discriminate the target objects. Further, time domain processing can be used to detect motion in the images. Any or all of these techniques could be combined to determine the presence and location of a human finger or other object in the active region. Optional feedback in the form of sounds generated by a small audio transducer and indicator lamps is useful in helping the user-operator determine when he or she has intercepted or withdrawn from the active detection region.

Translation to Mouse Functions

Mouse motion can be simply determined by the motion of the user's finger in the optical plane. Improved usability can be achieved with additional processing of the motion in the active region. If the user wants to place the computer cursor on an object on the display, the user needs to move the cursor to the location, then withdraw his or her finger. The process of withdrawing his or her finger inevitably results in unwanted motion. This unwanted motion has two causes: it is difficult to remove a finger in a motion absolutely perpendicular to the optical plane, and a person's finger is not symmetrical in cross-section, so the center of the image moves as the cross-section of the finger decreases.

A solution is to withdraw the finger quickly when the cursor is at rest where the user wants it, and the touchless HID can move the cursor back to where the finger last came to rest in the image plane regardless of the motion of the finger withdrawing. This has been tested and is workable. One can move the mouse a greater distance than the range of this touchless HID by moving the finger across the plane, withdrawing it, and reintroducing it at the other end of the optical plane and moving it again. It is also possible to simulate a coasting motion if the user withdraws his finger while it is moving rapidly, and the touchless HID could continue sending decaying motion messages in that direction. It is possible to detect two fingers in the plane if they are far enough apart. Moving two fingers through the plane could simulate a mouse scroll wheel or other functions.

Another solution is to vary the gain of the calculated mouse position changes based on the velocity of the finger. For example, if the operator is moving his finger at 1.0 centimeter per second, the device might transmit position changes at a rate of 100 position units per centimeter traveled, but at 0.2 cm per second the device might transmit position changes at a rate of 20 position units per centimeter. This helps minimize the cursor motion when the operator's finger is withdrawn, and helps the operator move the cursor to a precise position on the computer screen.

A further mode of operation simulates the function of a joystick. A virtual center zone is created in the active region, either by creating a fixed zone in the center of the active region, or by creating a zone based on the location that the finger is first introduced into the active area. The distance and direction of the position of the finger with respect to the center zone is used to emulate the distance and direction of deflection of a joystick. A dead zone is required around the center zone to improve usability.

Still a further mode of operation is used for controlling display scrolling and other gross motion. Sweeping motions of a finger or other object through the active region can activate screen scrolling and similar functions by emulating the scroll wheel on a mouse, by emulating the scrolling functions on a keyboard, or by employing a proprietary interface for scrolling and related functions, such as zooming or sequential object selection.

Mouse button functions are simulated by several methods. First, rapidly introducing the user's finger and then withdrawing it (as though the user were tapping an imaginary button in space) can simulate a single click of a mouse button. If this sequence is detected, the cursor is returned to the original position before the event, and a button click message is sent to the computer. Doing this twice rapidly would generate a double click. A click and drag could be simulated by inserting, then withdrawing, then inserting rapidly, then moving the cursor. This is relatively natural for someone who has used a mouse. A second approach would be to introduce the user's finger into the plane while rapidly moving in different directions. For example, sweeping the user's finger into and out of the plane rapidly from left to right could represent a single click, and from right to left a double click. Moving rapidly into the plane from the left and then stopping in the plane could represent a left mouse button down and held for dragging. A third approach would be to use two or more fingers to encode some mouse click type functions.

Mouse button functions can be simulated using methods independent of the mouse motion sensing methods. Optoelectronic reflective sensors have been used, creating a zone in space, which will detect the proximity of an object such as a finger. Hysteresis or an imperceptible lag in the system is used to prevent accidental, multiple detections and oscillations.

Addition methods for simulating the mouse buttons include adding electrical switches to the device that are activated with a finger, wrist, or forearm, or activated by feet or knees, or capacitive type proximity or touch sensors.

Touchless HID Embodiment

Figure 1:
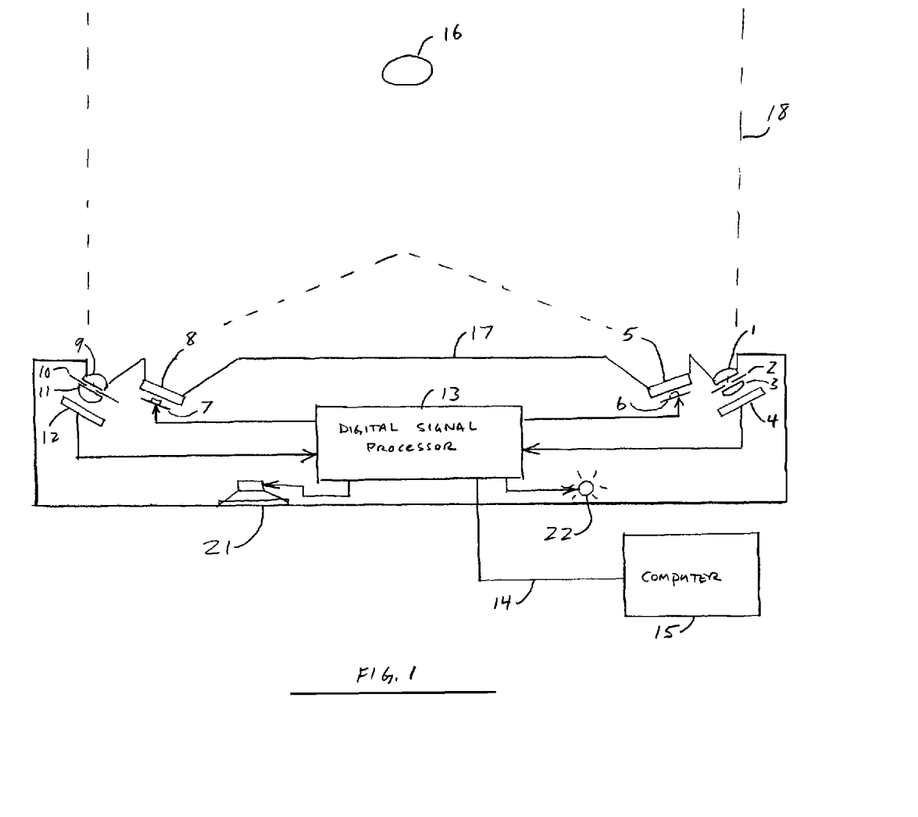
FIG. 1 is a schematic view of a preferred embodiment of the present invention touchless human input device (HID).

The drawing figures depict one preferred embodiment of the present invention HID described above. FIG. 1 shows a schematic cross-section of a preferred embodiment touchless HID 100. Lenses 1, 3 focus a linear image of the active detection region plane 18 onto a linear optical sensor/detector 4 through an aperture or band pass filter 2. A light source 6, preferably a near infrared LED or like emitter, is focused into the same plane using a cylindrical lens 5. A mirror image of this arrangement is located on the other end of touchless HID 100; i.e., light source 7, cylindrical lens 8, lens 9, aperture 10, lens 11, optical sensor/detector 12. The emitter/detector assemblies are aimed crisscross toward the detection region 18. A digital signal processor 13 controls the light sources 6, 7 and operates the linear optical sensors/detectors 4, 12. An optional audio transducer 21 and optional indicator lights 22 are used to communicate with and give feedback to the user on operation of the device. A cross-section of the user's finger 16 is shown within the active detection region plane 18. A digital communication link 14, here a USB cable, leading from the touchless HID 100 communicates with a host computer 15. The touchless HID 100 is contained in a housing 17.

The present invention preferably uses a linear sensor, not a CCD camera. The touchless HID provides the infrared light source, and modulates the light source to eliminate other light sources. As distinct from a CCD camera, the present invention infrared detector and microprocessor do not recognize features, like a hand or fingers. Rather, the preferred embodiment linear detector and microprocessor just identify the centroid of any object found in the detection region, so there is no pattern or feature recognition, and no need to distinguish the user's finger from other objects in the data. Not having to perform feature recognition greatly simplifies the electronics and analytical software performed by the digital signal processor 13.

Furthermore, the present invention touchless HID 100 normally only detects objects that are in the active region 18 due to the combination of modulated local illumination, near infrared imaging, a confined field-of-view, and recognizing solutions that only lie in the active area. The confined field-of-view is one result of using a unique frame structure, described in further detail below, which physically defines x and y axes within a rectangular opening sized proportional to and scaled to represent the screen of the computer monitor 20.

Moreover, the present invention touchless HID has the infrared illumination source located close to the detectors, so only objects that are relatively near the illumination source will be illuminated brightly enough to be seen by the detectors. This eliminates objects that are farther away, for example, a person walking by a few feet away.

Using near infrared imaging reduces or eliminates the blinding (i.e., saturating the detector) effects of bright light sources such as overhead fluorescent lighting, a desk lamp, or a computer or laptop monitor sitting next to the touchless HID.

To achieve the high signal-to-noise ratio of the present invention light source and detector combination, the linear detector is only seeing a narrow line, like looking through a crack in the door. Anything that is not visible to the detector through the crack of the door is not detected. As such, when each linear detector's data is processed, and both detectors' data have a "hump" of sufficient amplitude and width, then the triangulation process is performed. If the answer to the triangulation lies within the active area, then it is considered a solution and is used to generate "mouse" position changes.

Furthermore, a linear sensor/detector is less expensive, and requires far less computation power to acquire and process the data from it as compared to a CCD camera. The algorithms for processing the one-dimensional data from the linear infrared detector is far simpler than processing the data from a two-dimensional imager such as a CCD camera.

Figure 2:
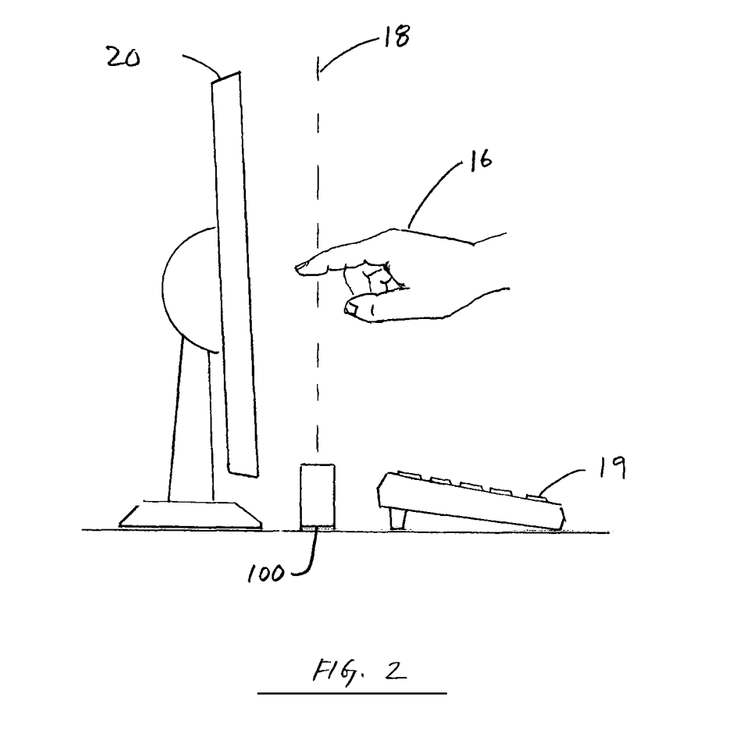
FIG. 2 is a side elevational view of the HID used in a vertical orientation in front of a computer monitor.
Figure 3:
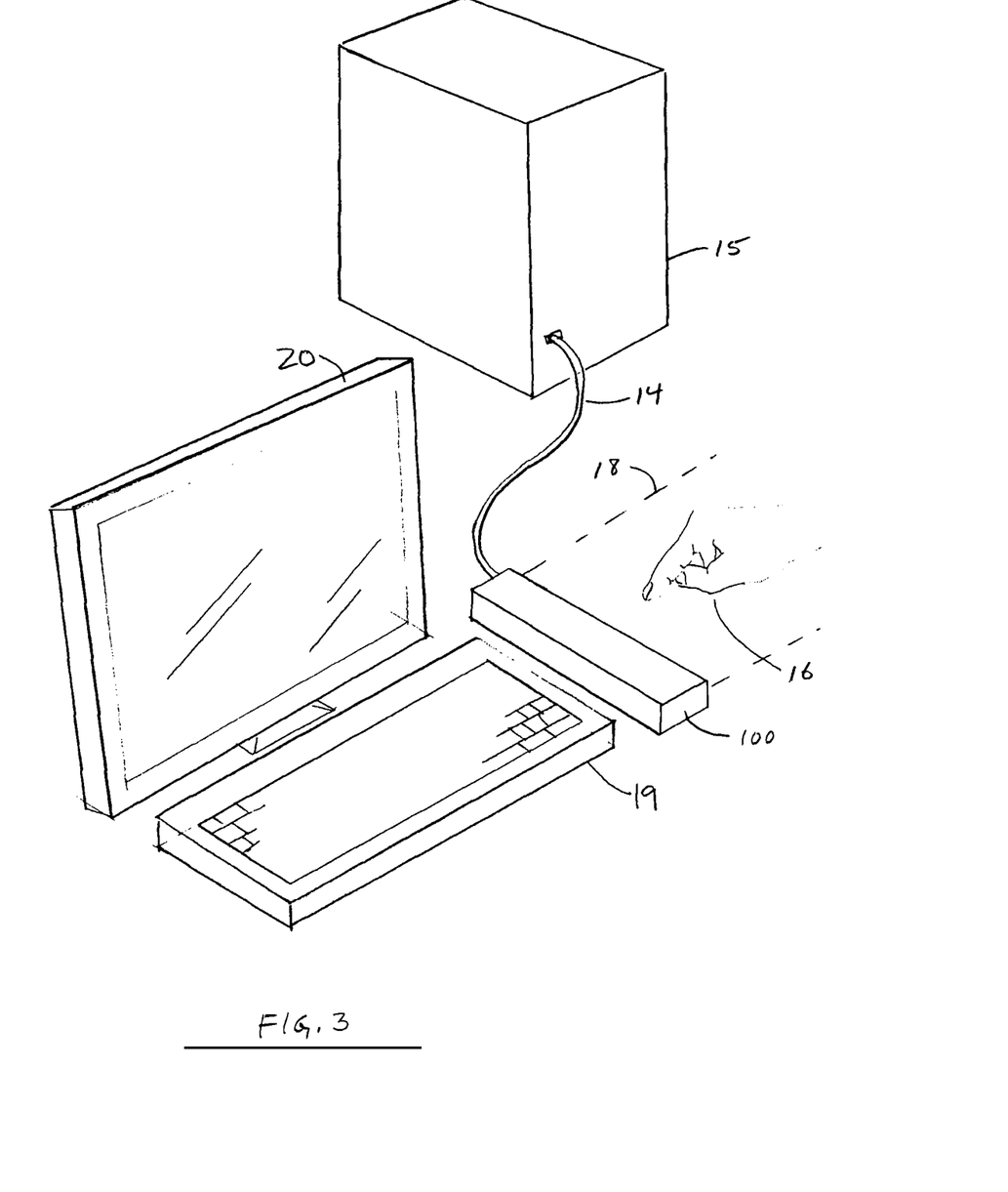
FIG. 3 is a perspective view of the HID used in a horizontal orientation adjacent a computer keyboard.

FIG. 2 shows the touchless HID 100 used in a vertical orientation in front of a computer monitor 20. The touchless HID 100 is operated by the user introducing his or her finger 16 or another object into the active region plane 18. FIG. 3 shows the device 100 in a horizontal orientation placed adjacent to a computer keyboard 19.

Figure 4:
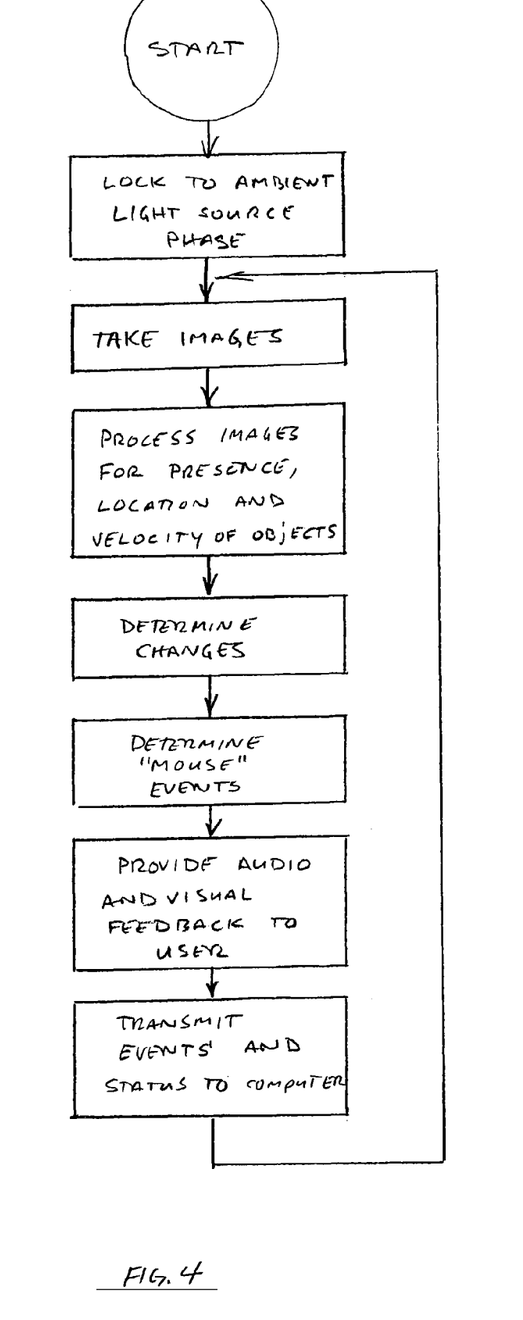
FIG. 4 is a flow chart of the general operation of the digital signal processor.

FIG. 4 shows a flow chart of the general operation of the digital signal processor 13 of FIG. 1. The general algorithm set forth in FIG. 4 is described in more detail below. Some of the steps in FIG. 1 may be omitted or skipped in various embodiments of the invention, such as "lock to ambient light source phase" is omitted in the touchless HID 100 embodiment.

The digital signal processor 13 is connected to the infrared emitter/detector assemblies for processing and triangulation the reflected imaging signals received from the sensors/detectors 4, 12. The illumination from the light source/infrared emitters 6, 7 falls on any object (e.g., user's finger) 16 that might be in the detection region or active area plane 18, and the light from such an object 16 is focused on the linear sensors/detectors 4, 12 creating a cross-sectional single line image of the object 16. The image data is in the form of a vector, i.e., a list of numbers, which represent the intensity of infrared light at discrete angles, similar to looking at a narrow strip of an image on a computer display or television. This image is processed by the digital signal processor 13, here a microprocessor, to find the object 16 that may be in the image. The vector will typically have values of close to zero where no object is present, and a "hump" where an object is introduced. The shape of the hump is typically similar to a Gaussian distribution, but can vary widely depending on the shape and optical characteristics of the object. The digital signal processor 13 looks for a hump, and if it finds one which is tall enough and of appropriate width to qualify as an appropriate pointing object, like a finger or a pencil, it then calculates the angle where the center of the hump lies in the image. This process is repeated for both linear sensors, yielding two angles. The two angles are transformed into x and y coordinates in the active area 18; triangulation on the pointing object is thus complete.

More precisely, the triangular algorithm operates as follows. The data from the linear detectors 4, 12 are read in by the analog to digital converter on the digital signal processor 13, and is put in an array. Each element of the array holds the intensity of light that reaches each corresponding detector element. This array is processed to find the element which best corresponds to the location of a pointer, such as the user's finger 16. This can be determined by methods such as looking for the peak amplitude, calculating the mathematical "centroid" of a peak, or calculating the mean of the half-maximum points. The centroid of the object, here, the cross-section of the user's finger, is thus ascertained.

The linear detectors have a number of equally spaced detector elements. A ray of light entering along the central axis of the focusing lens falls on the center element(s) of each detector. The optics are arranged so the lenses are looking at 45 degrees to the active area. Other angles may be used, but 45 degrees is preferred for convenience. The field of view of each detectors is at least 90 degrees, so each can see the entire active area. The center elements represent the angle of the center of the field-of-view, and the element number, counting the center element as zero, represents the tangent of the angle of a ray, such as the ray corresponding to the centroid. Taking the arc-tangent of the element number (with appropriate scaling) yields the angle to the centroid object. Since the distance between the two detectors is known, and the angles to the object as seen by the two detectors are known, the x-y Cartesian coordinates of the object can be found by solving for the intersection of the two rays. This process is repeated typically from a few hundred to a few thousand times per second. In the case of a computer mouse application, the difference between the coordinates in successive frames is scaled and sent over the USB bus 14 to the host computer 15 to emulate a mouse or trackball input to move the cursor.

Alternatively, the x and y deflections from a reference x-y position are sent to simulate a joy stick. This reference position can be either a fixed region in the active area 18, or can be the x-y position where the finger 16 is first introduced to the active area 18.

In summary, the present invention in a preferred embodiment is directed to a touchless HID using two or more linear detectors imaging a planar detection region. Multiple light sources, preferably in the near infrared range, are modulated to attenuate background objects. The linear detectors look for one or two small cylindrical objects (i.e., the user's finger or fingers, a pencil, a stylus) breaking the detection plane. The device returns the cursor to the last position with low or no velocity when the object is withdrawn. The device uses time domain observations of object(s) entering and leaving the plane to encode mouse functions. Using the direction and velocity of the object(s) entering and leaving the plane, a digital signal processor encodes mouse functions using the standard mouse USB protocol to connect to a computer. An audio feedback feature helps the user-operator determine where the plane is in space. Optionally, the touchless HID 100 may use a special cursor on the computer screen that provides feedback to inform the operator when he or she has broken the plane with his or her finger. A calibration technique is optionally included in the touchless HID 100 to scale the movement in the plane to a background such as a monitor or a special pad.

It is also contemplated in an alternative embodiment to use the present invention touchless HID in combination with an on-screen virtual keyboard (see, e.g., http://www.lakefolks.org/cnt/) to input text data. It is possible to make the present invention device with multiple sensor planes to add a third dimension of detected motion for the user's finger within the detection region. It is further contemplated to add a visible planar light source such as a laser with a line generator in the sensing plane to give the user feedback of his or her finger location, articulation, and movement.

The device communicates these motions and events to the computer typically using a Universal Serial Bus (USB) or PS2 link, and using the communication protocols that are normally used by a computer mouse. The link between the touchless HID may also be an ethernet cable, a serial cable, a fiber optic cable, an HDMI cable, or a wireless transmission via an infrared transceiver, a radio transceiver, or a WiFi transceiver. If operating wirelessly, the touchless HID may be powered by a battery pack.

A Touchless Pointing Device Embodiment

Figure 5:
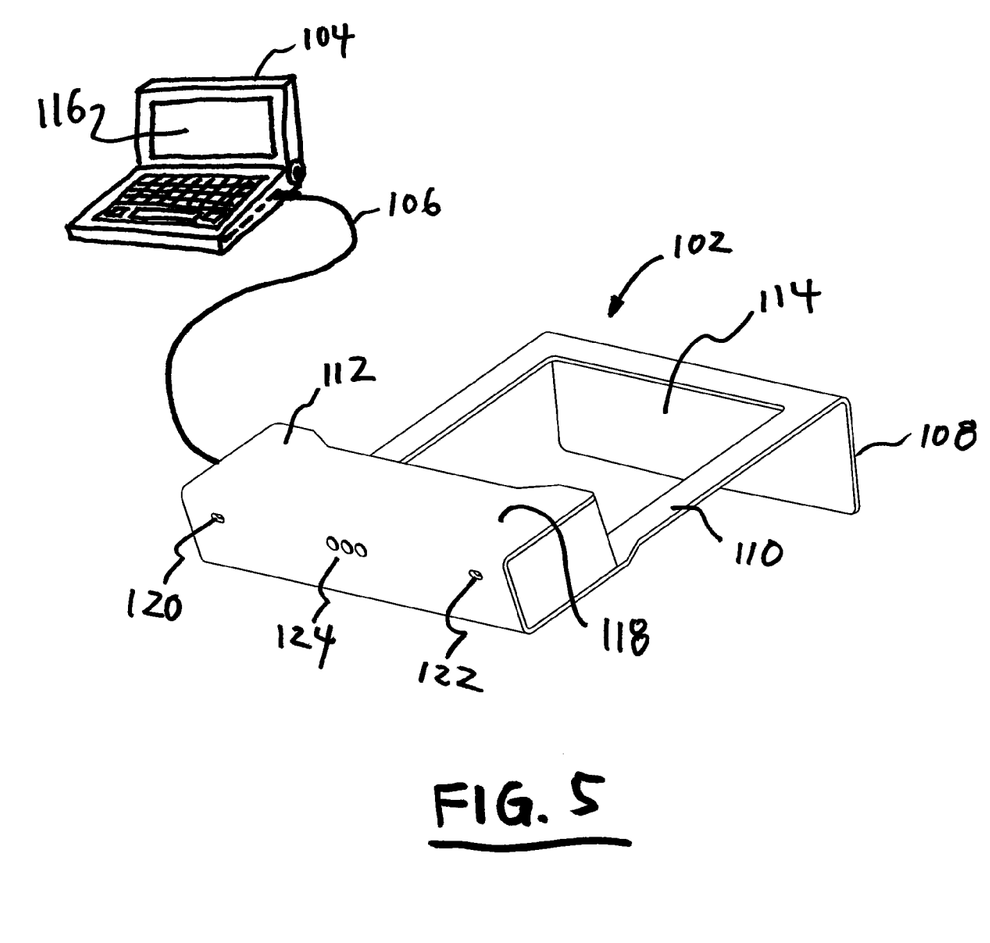
FIG. 5 is a front/bottom perspective view of a touchless pointing device embodiment.

FIG. 5 is a front-top perspective view of a touchless HID as embodied in a pointing device or mouse 102 for controlling a cursor or inputting data into a computer, workstation, laptop 104 via USB cable 106. The pointing device 102 and the computer 104 depicted in FIG. 5 are not drawn to any scale. In the preferred embodiment, the touchless pointing device 102 is built on a frame 110 that begins as a single, flat sheet of material that is bent 90 degrees and 90 degrees again at the bottom edge to form a channel that will be used as a compartment 112, and bent downward at the top edge to form an optional support or leg 108. The frame 110 is preferably formed from a single sheet of medical grade stainless steel, bent and cut into its finished form via metalworking techniques known in the art. Other materials such as aluminum, plastic, fiberglass, and the like can be used as well.

In its finished form in FIG. 5, the frame 110 is about 7¼ inches high by about 7 inches wide. The bend to create the leg 108 at the top edge may be 90 degrees or an acute angle as shown. The compartment 112 juts out near the bottom of the frame 110 with a planar front face 118. The front face 118 juts forward toward the user by about 1¼ inch thereby providing a space between the front face 118 and the back plane of the frame 110. The support leg 108 lifts the top edge of the touchless pointing device 102 about 2 inches off a flat resting surface such as a desk or table top. Just above the compartment 112 is a planar area of the frame with a through-hole opening 114. This opening in alternative embodiments (not shown) can be a simple rectangular or whatever-shaped depression instead of the through-hole.

The opening 114 is preferably a polygonal shape such as a square or rectangle as shown. The rectangular opening 114 is preferably about 5 inches wide by about 4¼ inches high. These dimensions approximate the aspect ratio of a standard 4:3 display of a television or pc monitor 116. An aspect ratio of 16:9 for the opening 114 is also contemplated for HDTV display monitors. Accordingly, the user's finger location and movement within the opening 114 are confined by the boundaries of the opening in the x-y directions, which boundaries help define the detection region to the user. The front face 118 of the compartment 112 is preferably planar, and it along with the planar back surface of the frame 110 define a space therebetween, which space helps define the detection region in the z direction for the user. The z direction gives the user a visual cue of how far into the opening 114 to insert his or her finger, stylus, pen, or pointer to operate the device.

The confines of the rectangular opening 114 correspond and are proportional to the x-y dimensions of the display monitor 116 being used. When the user's finger enters the opening 114 near, say, the top edge of the opening 114, that intrusion location will appear as a cursor blip or similar indicator in the corresponding location on the video monitor 116. The foregoing elements of the touchless mouse 102 thus give the user specific orientation to precisely place his finger into the detection region/opening 114 to control the cursor on the computer screen 116. The dimensions noted above have been found through empirical studies to be ideal for a typical user in view of the operating parameters of the near infrared detectors, lens focal lengths, detector sensitivity, user finger size which finger may be gloved, finger movement, electronics limitation, software errors, etc. But other shapes, proportions, and sizes for the opening 114 and frame 110 are contemplated, which parameters are dictated by the specific application for the touchless pointing device 102.

With the given dimensions and the support 108 at the top edge of the frame 110, the touchless pointing device 102 is ergonomically tilted toward the user at about 15 degrees±1 degree from the horizontal table top. This preferred tilt angle, as confirmed by empirical observations, gives the user comfortable access to the detection region defined by the opening 112 without an unnatural wrist bend, yet avoids the user's hand or palm from accidentally coming in contact with the pointing device 102. To be sure, the present embodiment touchless pointing device 102 is intended for a sterile medical environment, such as a clinic, hospital, specimen lab, ambulance, first aid station, etc. Because of the high potential for bacterial, viral, biohazard, cross-patient contamination or infection, the present invention pointing device 102 is designed so that it can be operated by the medical tech, nurse, physician, data clerks, etc., without him or her ever coming into physical contact with any part of the device.

The touchless pointing device 102 has along its bottom edge left and right apertures 120, 122. Behind the apertures 120, 122 are located the emitter/detector assemblies which are used to emulate left and right mouse clicks when the user's finger(s) enter the respective detection regions immediately in front of the apertures. Optional multicolor LEDs or indicator lights 124 provide the user with feedback and elementary information such as finger detected, mouse click, power on, standby, malfunction, etc. An optional speaker (not shown) hidden inside the compartment 112 may be used to supplement audible feedback to the user.

Figure 6:
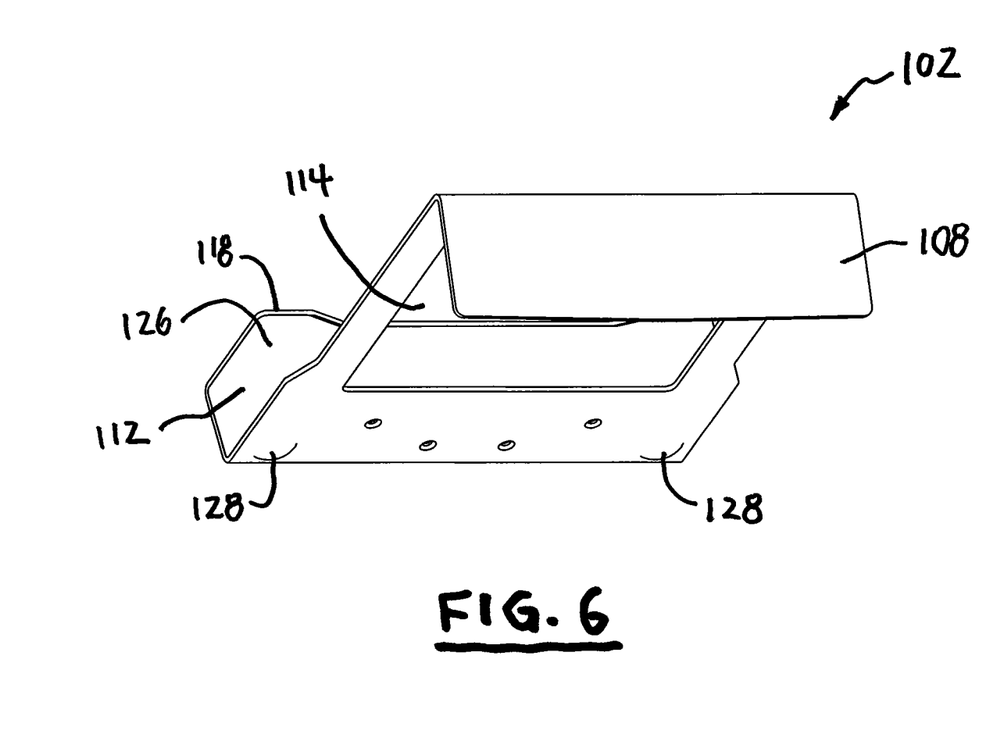
FIG. 6 is a back/top perspective view of the touchless pointing device of FIG. 5.

FIG. 6 is a top edge-back view of the touchless pointing device 102. The open space of the compartment 112 between the back plane and the planar front face 118 is covered by an infrared transparent cover 126. Underneath the device 102 near the bottom edge are optional bumper feet 128.

Figure 7:
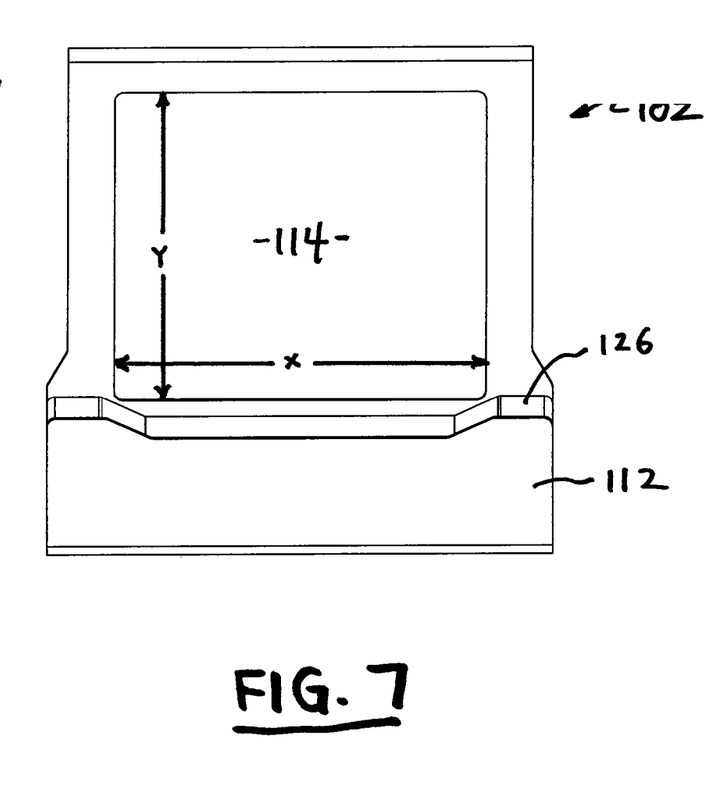
FIG. 7 is a front plan view of the touchless pointing device of FIG. 5.

FIG. 7 is a front view of the touchless pointing device 102, where the rectangular opening 114 above the compartment 112 can be clearly seen with imaginary x and y axes defining the detection region. With the four straight edges of the rectangular opening 114 acting as physical boundaries, it is clear that the user knows exactly the confines of the detection region delimited by those boundaries. The size of the opening 114, based on the dimensions noted above, give a user with a bare or gloved finger or fingers to move about inside the opening comfortably with sufficient precise control of the cursor. Too small of an opening, for instance, does not allow the user to navigate within the tight confines, leading to too large and erratic jumps in the cursor's movement. Too large of an opening makes the touchless pointing device itself 102 too bulky, with a large footprint that occupies too much area on a desk top.

Figure 8:
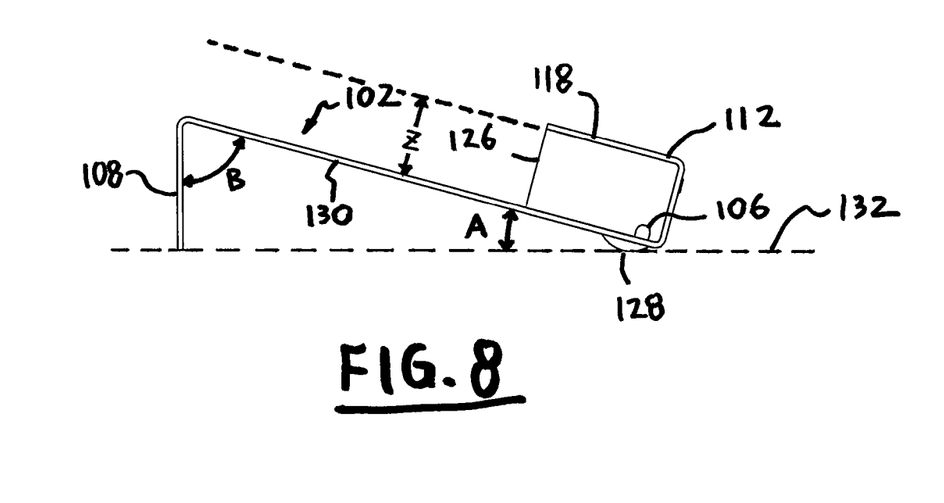
FIG. 8 is a side elevational view of the touchless pointing device of FIG. 5.

FIG. 8 is a side elevational view of the touchless pointing device showing the imaginary z axis for the detection region between a plane (broken lines) containing the planar front face 118 and back plane 130. Angle A as defined above and measured from the horizontal work surface or desk top 132 is used to tilt the device 102 toward the user, allowing easy access to the opening 114 defining the detection region without the user's palm or curled fingers inadvertently bumping into any part of the frame 110. Such accidental contact could contaminate the pointing device 102, which would be undesirable in a medical environment. Angle B as mentioned above is preferably an acute angle, but depending on the shape of the leg 108, it can be a range of angles chose to complement the shape and direction of the leg.

Figure 9:
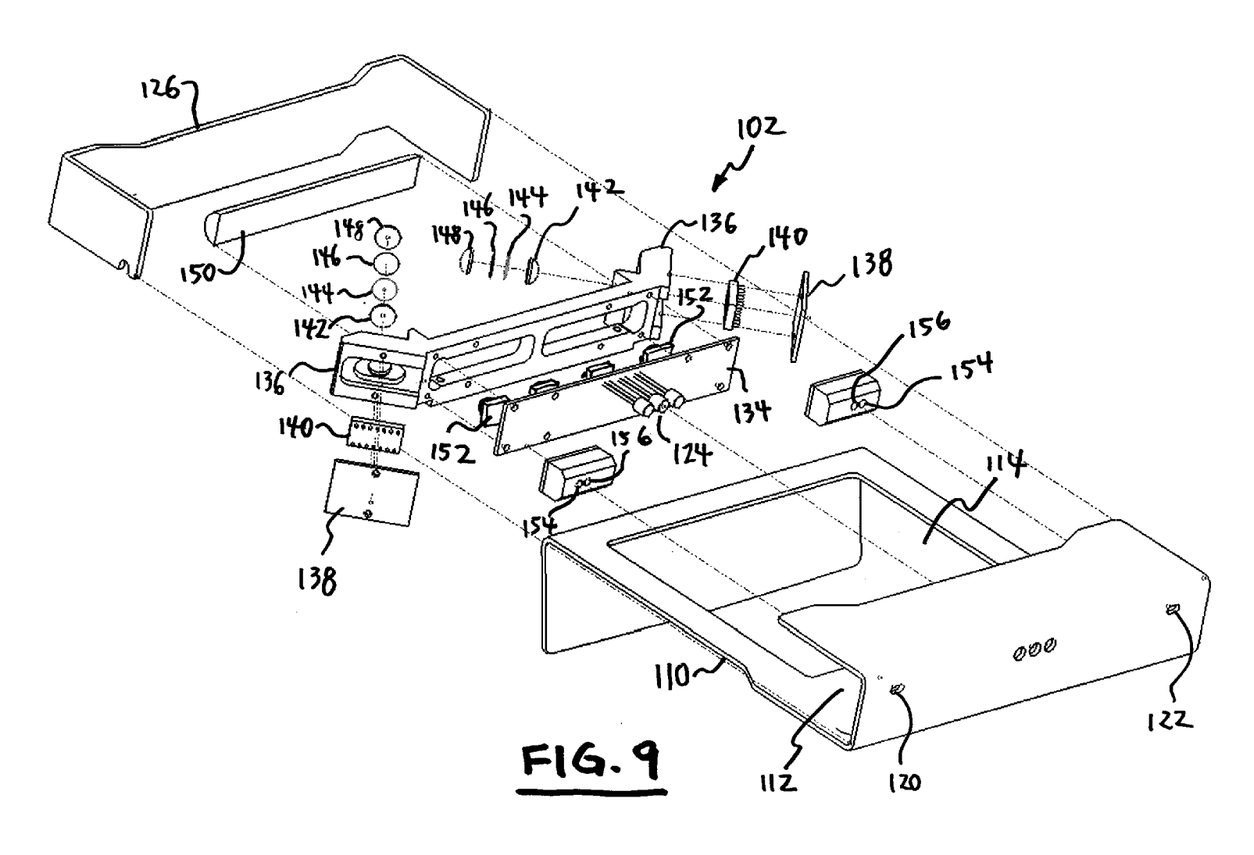
FIG. 9 is an exploded view showing the major internal components of the touchless pointing device of FIG. 5.

FIG. 9 is an exploded view of the touchless pointing device 102. As seen in the drawing, the electronics and hardware are preferably contained within the compartment 112 of the frame 110. A main printed circuit board assembly (PCBA) 134 is where the digital signal processor/microprocessor (not shown) is mounted. The main PCBA 134 is mounted on housing 136, which structure is rigid to ensure alignment of the optics, emitters, and sensors that are mounted to it. Each end of the housing 136 is canted so that the detector assemblies 138, 140 are aimed in a crisscross fashion as seen in FIG. 9. The crisscross concentrates detection of the region over the opening 114. In particular, each end of the housing 136 has a linear detector PCB 138 and a near infrared, linear detector 140 attached. In front of the linear detector 140 is a focusing lens 142, an aperture 144, an infrared band pass filter 146, and another focusing lens 148. The aperture 144 has a tiny hole to provide a high F-stop to act in conjunction with the lenses 142, 148 for good depth-of-field. The filter 146 is intended to pass infrared light while visible light and light in the other wavelengths are blocked. These features minimize unwanted stray reflections from outside of the detection region, background lighting from ceiling or desk lamps, bright computer monitors and the like from reaching the detector 140, which signals would otherwise disrupt proper function of the detector 140.

Preferably four near infrared LED emitters 152 are mounted to the main PCBA 134 and aimed toward the opening 114 through the cover 126. A half-cylindrical focusing lens 150 is positioned in between the left and right detector lens 148 and in front of the IR emitters 152. With the use of the focusing lens 150 in this embodiment, the LED emitters 152 are not aimed crisscross into the detection region/active area generally coinciding with the opening 114, but the IR emitters 152 still illuminate the detection. Specifically, the half-cylindrical lens 150 focuses the light from the IR emitters 152 into a line, which illuminates the detection region from the edge. There are preferably four infrared sources on the main board 134, but the quantity can vary depending on the requirements of the system. Data from the emitted/detector combinations are transmitted to the digital signal processor and triangulation of the user's finger within the detection region and movement thereof are achieved as described above. Power is supplied via the USB cable 106 to the main PCB 134.

Left and right apertures 120, 122 at the bottom of the frame 110 are ports for emitting and detecting infrared light. More precisely, the near infrared light is generated via a near IR emitter 154 and sensed via an IR detector 156. These signals are used to detected finger intrusion into the detection field directly in front of the apertures 120, 122 to emulate left and right mouse clicks.

A group of feed back indicator lights 124, preferably different color LEDs, give the user visual cues for feedback. The indicator lights 124 are wired to the back of the main PCB 134.

Figure 10:
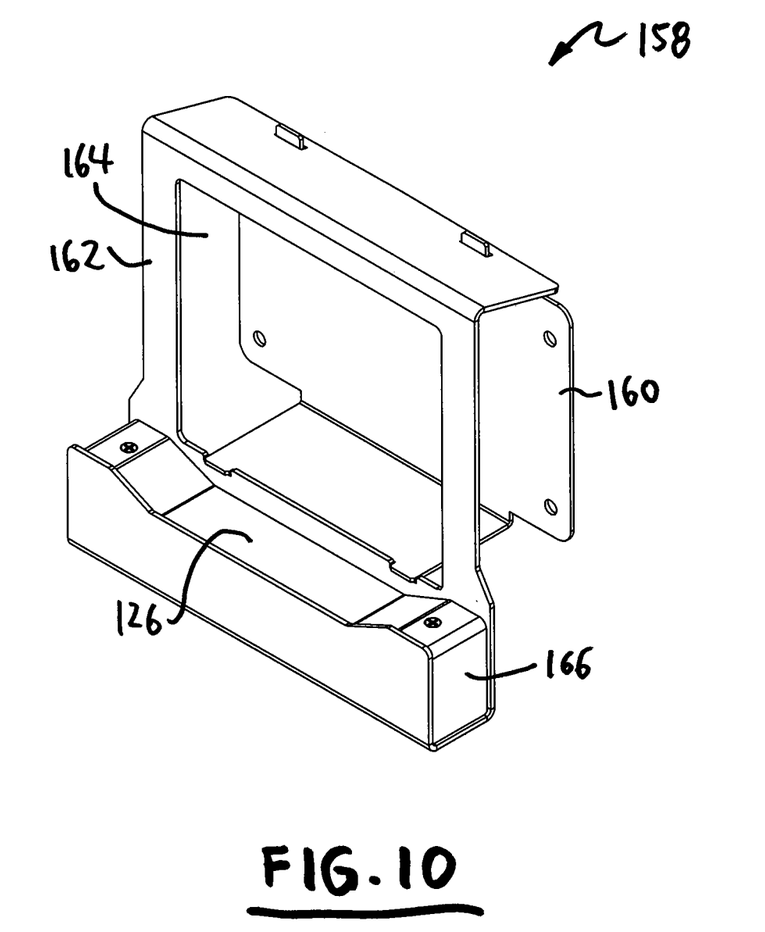
FIG. 10 is a top-front perspective view of an alternative embodiment of a touchless pointing device adapted for vertical mounting and use.
Figure 11:
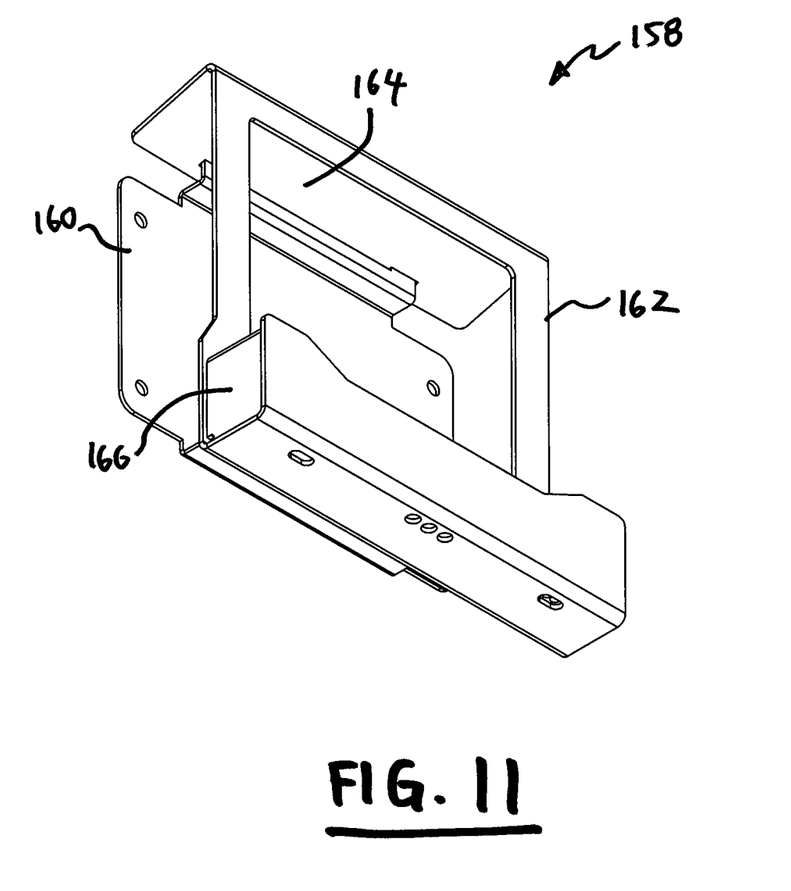
FIG. 11 is a bottom-front perspective view of the touchless pointing device of FIG. 10.

FIGS. 10 and 11 are different perspective view of a vertical embodiment of a touchless pointing device 158. This alternative embodiment touchless pointing device 158 has a back mounting plate 160 that moves the frame 162 away from the vertical structure to which the device 158 is mounted. The frame 162 has detection region defined by the rectangular opening 164 and a compartment 166 directly below containing the optics, emitters, detectors, electronics similar to that shown in FIG. 9. Although shown in FIGS. 10, 11 with the compartment 166 oriented below the rectangular opening detection region 164, it is contemplated that the touchless HID 158 can me oriented with the compartment 166 to the left, to the right, or above the rectangular opening detection region 164 in various alternative embodiments. Cover 126 encloses the optics, emitter, detectors, and electronics inside the compartment 166.

The vertical embodiment of the touchless pointing device 158 may be attached to the front panel of a vending machine for a buyer to make a selection of candy, chips, soda, etc. The rugged nature of the touchless pointing device would be a good alternative to, say, a touch screen or keypad that can be easy vandalized or abused. The vertical embodiment 158 can likewise be used in a control panel for refrigeration or machinery in a manufacturing or harsh environment; it may be used in an outdoor public information kiosk, a security door panel, ATM, or the like, where outdoor weather conditions and heavy manhandling will damage a conventional keyboard, mouse, trackball, or joystick.

While particular forms of the invention have been illustrated and described, it will be apparent that various modifications can be made without departing from the spirit and scope of the invention. Accordingly, it is not intended that the invention be limited except as by the appended claims.

We claim:

1. A touchless pointing device to control a computer in a sterile environment wherein a user controls with a digit, hand gesture, or stylus but does not directly contact the pointing device for operation, comprising:
    a frame having a top edge, a bottom edge, a first planar area between the top and bottom edges containing a polygonal opening therethrough, and a compartment adjacent the bottom edge, the compartment having a front wall defining a second planar area, wherein the second planar area is substantially parallel to the first planar area;
    a support adjacent the top edge to incline the frame;
    at least a first and a second infrared emitter/detector assemblies disposed in the compartment and aimed at the polygonal opening of the frame, projecting and detecting a flashing infrared signal within a first detection region defined by the polygonal opening containing x and y axes and in between the first and second planar areas for a z axis;
    at least a third and a fourth infrared emitter/detector assemblies contained within the compartment aimed through apertures at the bottom of the frame to define second and third detection regions proximate the apertures;
    a lens and filter adapted to at least the first and second emitter/detector assemblies;
    a digital signal processor connected to the infrared emitter/detector assemblies, wherein a flashing reflection from the digit, hand gesture or stylus is received simultaneously by the emitter/detector assemblies, and processed by the digital signal processor to detect the presence, two-dimensional position, and motion of the digit, hand gesture or stylus within the first detection region; and
    a power and signal cable connecting the computer to the digital signal processor.

2. The touchless pointing device of claim 1, wherein the first and a second infrared emitter/detector assemblies include a near infrared linear detector.

3. The touchless pointing device of claim 1, wherein the device includes at least one of a visual feedback LED connected to the digital signal processor, which digital signal processor also includes a tone generator.

4. The touchless pointing device of claim 1, wherein the frame is fabricated from a single, integral sheet of material wherein the support at the top includes a section of material folded downward, and the compartment includes two sections of material folded to form a channel.

5. The touchless pointing device of claim 1, wherein at least the first and second infrared detectors are aimed crisscross and a half cylinder shaped focusing lens is positioned along the signal paths of the first and second infrared emitters.

6. The touchless pointing device of claim 1, wherein at least the first and second infrared emitter/detector assemblies are aimed crisscross into the first detection region.

7. The touchless pointing device of claim 1, wherein frame is inclined at about 15 degrees +/−1 degree relative to a horizontal surface.

8. The touchless pointing device of claim 1, wherein the lens includes a high F-stop small aperture.

9. The touchless pointing device of claim 1, wherein the filter enables passage of infrared light only.

10. The touchless pointing device of claim 1, wherein the polygonal opening includes a rectangular shape that is proportional in size to a display screen of the computer.

11. The touchless pointing device of claim 1, wherein the device functions as a mouse such that movement of an object within the first detection region controls movement of a cursor of the computer, and objects detected within the second and third detection regions duplicate left and right mouse clicks.

12. A touchless pointing device to control a computer in a sterile environment wherein a user controls with a digit, hand gesture, or stylus but does not directly contact the pointing device for operation, comprising:
  a frame with a compartment having a thickness, and the frame including a first planar area containing an opening therethrough;
  at least a first and a second electromagnetic signal emitter/detector assemblies disposed in the compartment and aimed out of the compartment toward the opening in the planar area of the frame, defining a first detection region generally bounded in x and y axes by the opening and in a z axis according to the thickness of the compartment;
  a third electromagnetic signal emitter/detector assembly contained within the compartment aimed through an aperture in the frame to define a second detection region proximate the aperture;
  a digital signal processor connected to the electromagnetic emitter/detector assemblies, wherein the emitter/detector assembly emits a rapidly flashing, unswept signal such that a flashing reflection from the digit, hand gesture or stylus is received simultaneously by the emitter/detector assemblies, and is synchronously de-modulated and processed by the digital signal processor to continuously detect the presence, two-dimensional position, and motion of the digit, hand gesture or stylus within the first detection region; and
  a signal transmission means for connecting the computer to the digital signal processor.

13. The touchless pointing device of claim 12, wherein the digital signal processor generates audio and visual signals conveyed to a LED and a speaker, respectively.

14. The touchless pointing device of claim 12, wherein the signal transmission means includes at least one of a USB cable, an ethernet cable, a serial cable, a fiber optic cable, an HDMI cable, an infrared transceiver, a radio transceiver, and a WiFi transceiver.

15. The touchless pointing device of claim 12, wherein a high F-stop lens and band pass filter are adapted to the detector of the first and second emitter/detector assemblies.

16. The touchless pointing device of claim 12, wherein the x and y axes bounded opening defining the first detection region is rectangular shaped and scaled proportionately to a screen size of a video display of the computer.

17. A touchless pointing device to control a computer in a sterile environment wherein a user controls with a digit, hand gesture, or stylus but does not directly contact the pointing device for operation, comprising:
  a frame having a compartment and a planar area containing an opening therethrough;
  a support underneath the frame to incline the frame toward the user;
  at least a first and a second infrared emitter/detector assemblies disposed at different locations in the compartment and aimed toward the opening in the planar area of the frame;
  a focusing lens disposed in front of the infrared emitters of the first and second infrared emitter/detector assemblies, wherein the focusing lens focuses a flashing infrared signal into a virtual plane defining a first detection region proximate to and generally bounded by the frame opening;
  at least a third and a fourth infrared emitter/detector assemblies contained within the compartment aimed through apertures in the frame to define second and third detection regions proximate the apertures;
  a digital signal processor connected to the infrared emitter/detector assemblies, wherein a flashing reflection from the digit, hand gesture or stylus is received simultaneously by the emitter/detector assemblies, and processed by the digital signal processor to detect a peak amplitude representing the reflection to detect the presence, two-dimensional position, and motion of the digit, hand gesture or stylus within the first detection region; and
  a signal transmission means for connecting the computer to the digital signal processor.

18. The touchless pointing device of claim 17, wherein the infrared emitter/detector assemblies operate in the near infrared range of about 0.74 µm to 1.4 µm in wavelength.

19. The touchless pointing device of claim 17, wherein the infrared emitter/detector assemblies include a linear, one-dimensional, infrared detector.

20. The touchless pointing device of claim 17, wherein the focusing lens includes a half cylinder shaped lens disposed in front of the emitters of the first and second infrared emitter/detector assemblies.

* * * * *